United States Patent [19]
Jones

[11] 3,903,760
[45] Sept. 9, 1975

[54] CIRCULAR SAW SHARPENING DEVICE

[76] Inventor: Russell P. Jones, 6059 Bradshaw Rd., Sacramento, Calif. 95826

[22] Filed: June 19, 1974

[21] Appl. No.: 480,941

[52] U.S. Cl............................................... 76/79; 76/42
[51] Int. Cl.².................................... B23D 63/14
[58] Field of Search .......... 76/42, 78, 79; 51/241 R, 51/225, 97 R

[56] References Cited
UNITED STATES PATENTS

| | | | |
|---|---|---|---|
| 1,135,245 | 4/1915 | Zuleg | 76/42 |
| 2,477,880 | 8/1949 | Kershaw et al. | 76/40 |
| 2,602,354 | 7/1952 | Hutsell | 51/241 R |
| 2,801,554 | 8/1957 | Iveson | 76/79 X |

Primary Examiner—Leonidas Vlachos
Attorney, Agent, or Firm—Blair & Brown

[57] ABSTRACT

A circular saw sharpening device is provided wherein there is a means for locating a blade on a centering piece, there being a means provided for securing the parts in their adjusted position. The teeth of the saw blade can be sharpened on one side, and the blade can be removed from the fixture turned over reinstalled so that a properlly shaped stone be brought down to the blade to proceed to sharpen the teeth in the desired manner.

3 Claims, 5 Drawing Figures

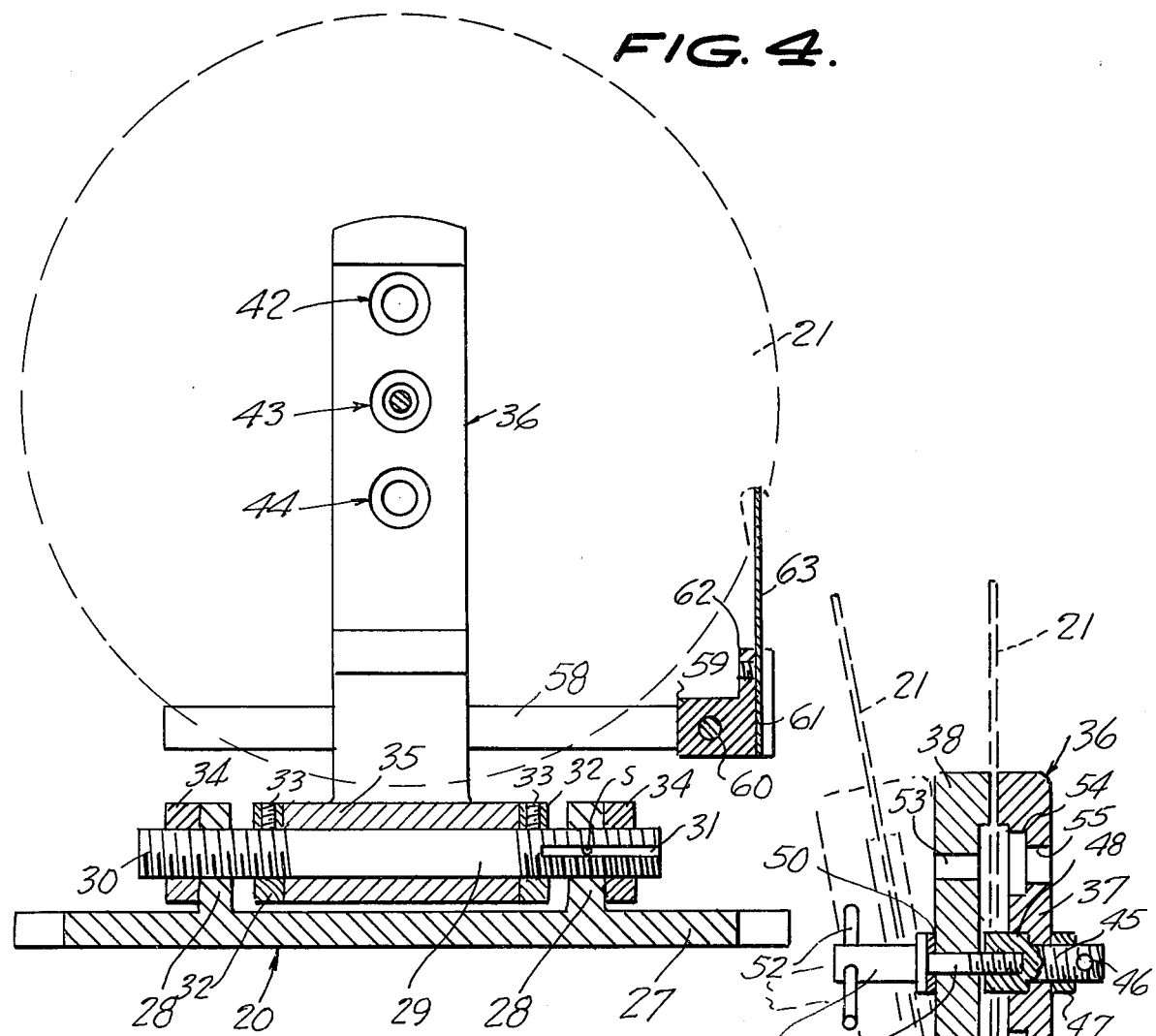

CIRCULAR SAW SHARPENING DEVICE

BACKGROUND OF THE INVENTION

FIELD OF THE INVENTION

The present invention relates to sharpeners, and more particularly to sharpeners for circular saw blades.

SUMMARY OF THE INVENTION

A circular saw blade sharpener is provided whereby blades with small teeth can be ground by positioning the parts in the proper location whereby various teeth can be ground to the proper degree of sharpness. Further, there is provided a means for trueing up the parts, and there is also provided a means for permitting various successive teeth to be sharpened in the desired manner.

The primary object of the present invention is to provide a circular saw sharpening device that will permit teeth of circular saw blades to be sharpened in most efficient manner.

Still another object of the present invention is to provide a circular saw sharpening device that is ruggedly constructed and relatively simple and inexpensive to manufacture.

Other objects and advantages will become apparent in the following specification when considered in light of the attached drawings.

BRIEF DESCRIPTION OF THE DRAWINGS

FIG. 4 is a vertical sectional view taken on the line 4—4 of FIG. 1; and

FIG. 5 is a transverse sectional view taken on the line 5—5 of FIG. 2.

DESCRIPTION OF THE PREFERRED EMBODIMENT

Figure 1:
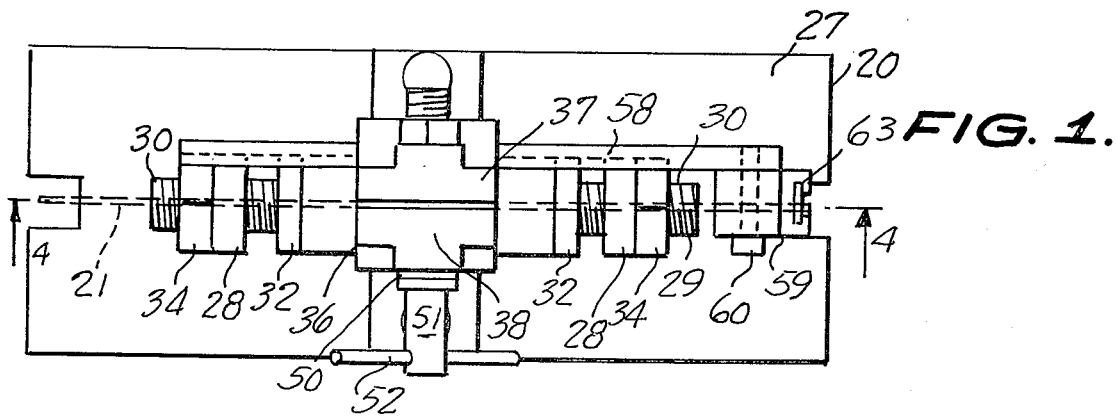
FIG. 1 is a top plan view of the circular saw sharpening device of the present invention.

Referring now to the drawings in detail, wherein like reference characters indicate like parts throughout the several drawings the reference numeral 20 indicates generally the circular saw sharpening device of the present invention. The device 20 is useful with sawblades such as 21 for sharpening the teeth 22 thereof. The device 20 of the present invention is used in conjunction with a conventional drill press 23 having a chuck 24 that serves to rotate a sharpening stone 26 mounted on a spindle 25, FIG. 2.

The sharpening device 20 of the present invention includes a horizontally disposed base 27 having a pair of upstanding spaced parallel apertured lugs 28 formed integral therewith. A shaft 29 extends through the aperture lugs 28. The ends of the shaft 29 are threaded as at 30, FIG. 4, and one end of the shaft 29 is provided with a keyway 31. A standard pin set screw S is threaded through the lug 28 to engage the keyway 31 thus locking the shaft 29 against rotation in the lug 28. Collars 32 are secured to the shaft 29 by set screws 33. Adjusting, locating and locking nuts 34 are arranged in threaded engagement with the threaded end portions 30 of the shaft 29. A body 35 is journalled on the shaft 29 between the pair of collars 32, FIG. 4, and a fixture 36, including a section 37, FIG. 5 integral with the body 35, extends upwardly from the body 35. The fixture 36 includes a moveable section 38 that is supported on a pivot 41 so that the section 38 can be selectively moved away from the section 37 to permit the saw blade 21 to be positioned therebetween.

Diametrically opposed flanges 39 are formed on the body 35, and limit stop screw members 40 are adjustably connected to the flanges 39 for selective engagement with the upper surface of the base 27 whereby swinging movement of the section 38 can be controlled as desired.

Figure 2:
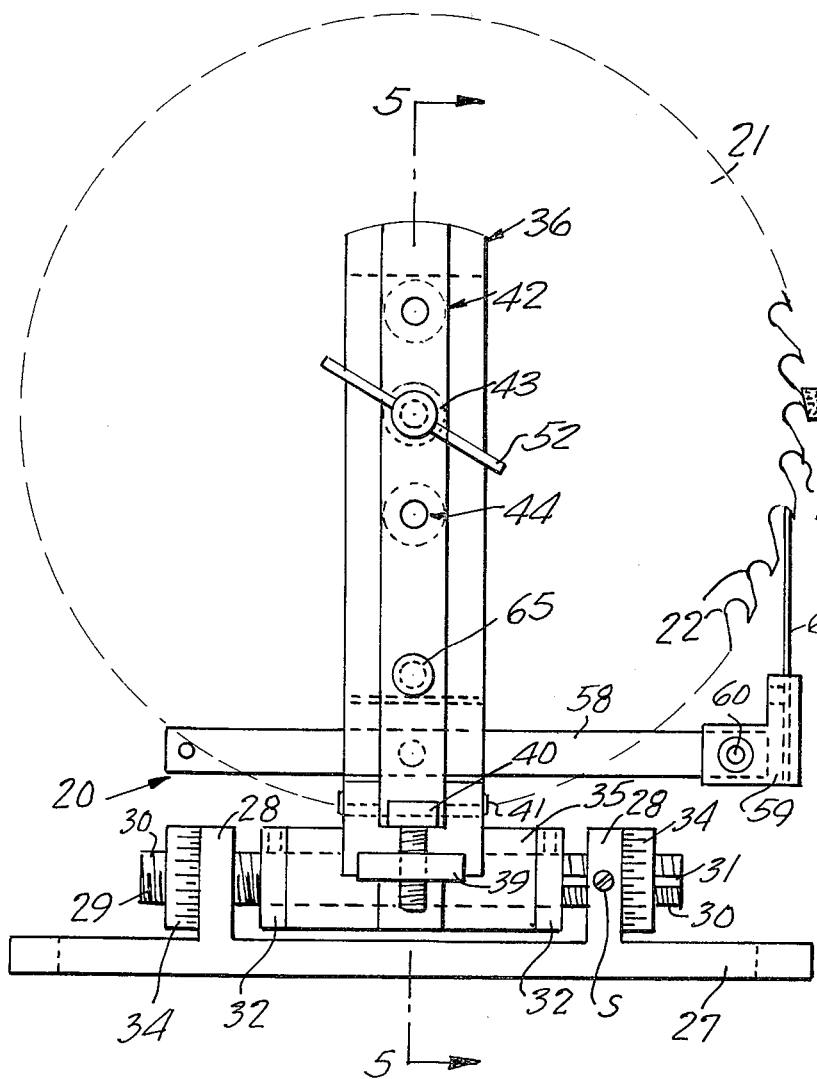
FIG. 2 is a side elevational view thereof.
Figure 3:
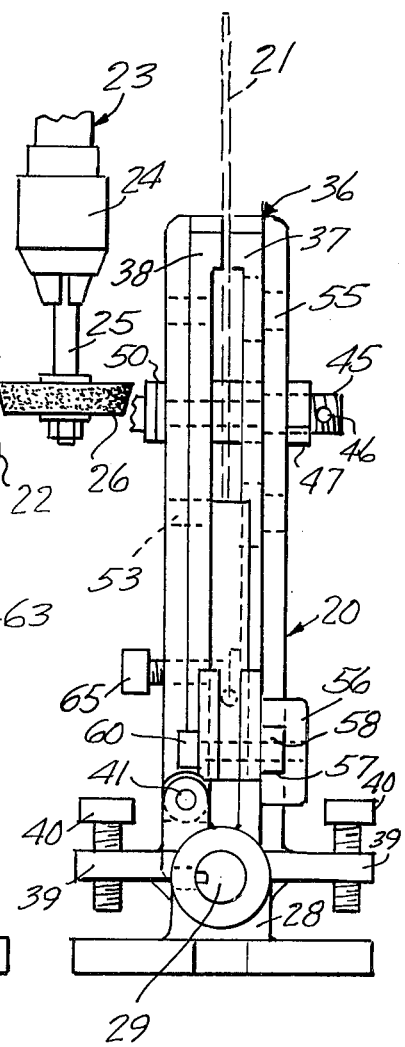
FIG. 3 is an end elevational view thereof.

A plurality of apertures 42, 43 & 44, FIG. 2, are provided in the fixture 36 to accommodate circular saw blades of different diameters. Each of these apertures will selectively support a stud 45 having a hole 46 therein, FIG. 5, whereby a lever can be inserted through the hole 46, and a nut 47 is arranged in threaded engagement with the shank portion of the stud 45. The stud 45 further includes an enlarged head 48 that has a threaded recess for receiving a threaded end portion of a bolt 49. A washer 50 is mounted on the bolt 49, and a fitting 51 is operatively connected to the bolt 49, and includes a hand gripping member 52 connected to the fitting 51. Openings 53 in the moveable section 38 of the handle 36 register with corresponding openings in the fixed section 37, and the last named openings include a counter sunk portion 54 as well as a reduced diameter portion 55.

The lower portion of the fixed section 37 of the fixture 36 is provided with a shoulder 56 that has a aperture 57 therein. A bar 58 is adjustably mounted in the aperture 57, secured by a set screw 64 for maintaining the bar 58 stationary in it's adjusted position. A holder 59 is suitably connected to one end of the bar 58 by pin 60, and the holder 59 is provided with a vertically disposed slot 61 that receives therein the lower end of the resilient leaf indexing member 63. The indexing member 63 is held in it's desired position by means of a securing element 62, FIG. 4. The upper end of the index leaf 63 engages the teeth 22 as shown in FIG. 2. The numeral 65 indicates an adjustable screw member that can be manually adjusted in order to help maintain the parts in their proper position.

When using the device 20, the movable section 38 of the fixture 36 is initially pivoted away from fixed section 37 by swinging the section 38 on it's pivot 41 thus permitting a dull saw blade 21 to be positioned between the sections 37 and 38 on the stud 48 and then the section 38 is clamped to the section 37. The index leaf 63 is positioned as shown in the drawings so that it's upper end engages the teeth 22 of the blade 21 to be sharpened. The drill press 23 is then energized and the teeth 22 are sharpened to the desired configuration.

It will be noted that the sharpening device 20 of the present invention includes a plurality of different adjusting features. For example, the parts can be swung from the solid line position of FIG. 5 to the broken line position of FIG. 5 due to the pivot mounting of the body portion and handle 36 on the shaft 29, and after these parts have been moved to their desired position elements such as the nuts 34 can be tightened to maintain the device stationary in it's adjusted position.

Also, there is provided a means for accommodating circular saw blades of different diameters, and for example the plurality of apertures 42, 42 and 44 are provided for supporting studs 48 to engage the center hole of the circular blade 21 whereby circular blades of different diameters can be worked on.

In addition the index leaf 63 can be adjusted to different positions as for example by loosening any of the various securing elements that are provided for this member and then after a member such as the index leaf 63 has been positioned in it's desired location, the securing elements can be tightened to prevent shifting thereof.

The parts can be made of any suitable material and in different shapes and sizes as desired or required.

The nuts 34 function as adjusting, locating and locking nuts. The index leaf 63 can be removed when desired. The stone 26 is operated by a conventional drill press 23. The collars 32 are secured to the shaft 29 as at 33. The body 35 is free to swing on the fixed shaft 29 as shown in the drawings. The numeral 65 indicates a tension screw, and the handle is provided with a boss for clearing the saw set and a spindle hole locating stud 45 is also provided. The numeral 41 indicates a hinge for the compression half 38 of the handle so that the handle can be opened for loading and unloading. The limit stop screws 40 are provided for locking limit stops 39 when jointing the saw blade.

The end of the bolt 45 protrudes from the rear of the device so that a lever can be temporarily placed in the hole 46 to hold the bolt 45 while the nut 47 is being tightened.

After the proper tension is achieved, the operator merely twists the handle and rotates the saw down so that the next tooth is indexed by the leaf 63, after which he twists the handle tightly and proceeds to sharpen the tooth.

With the saw blade sharpener 20 of the present invention, the user can grind the front or hook side of the tooth, remove the index blade holder, loosen the set screw holding the index bar, slide the bar to the far side, replace the index leaf holder on the opposite side. Next, the blade can be removed from the fixture, turned over, reinstalled, the index leaf 63 can be adjusted, and the user can bring the proper shaped stone 26 down to the blade and proceed a tooth at a time as before.

The circular saw blade sharpening device of the present invention can be used for sharpening a circular saw blade with a shaped grind stone on an arbor chucked for securing to a spindle of a bench drill press. The position or height of the grind stone is obtained by raising or lowering the manually operated drill press spindle, and then the spindle is locked in position.

In operation, the blade 21 is located on the centering piece on fixed or solid support half of the fixture 36. The hinged half 38 is closed on the blade. The tee handle stud is inserted through the hole in the hinged half 38 and into the tapped hole in the centering piece, and screwed clockwise until the threads are engaged and the blade 21 is clamped slightly. The bottom support screw 65 can be adjusted to seat on the blade. The blade 21 is then rotated to proper position in relation to the stone 26 and clamped securely with the tee handle 52. The index leaf 63 is positioned and engaged with the blade 21. The blade and clamping device as a unit are brought to the stone 26 with the adjusting nuts 34 on the shaft 29. The back nut is backed off, then while swinging the unit to and from the operator, the front nut is tightened until the blade sparks slightly. The back nut is screwed up secure and maintained in the position of the blade and blade holder. The tee handle is retightened and the unit is swung to and from the operator across the grind stone 26.

Further, blades with many small teeth such as finish cross cut, plywood and the like can be ground by positioning the base to angle with properly shaped stones, setting the stop screw on one side to limit swing and plunge grind every other tooth, and then the process can be reversed and the remaining teeth can be done.

Also, to joint or true up the blade for a run out, the limit screws 40 are both turned down, the index leaf 63 is moved clear of the blade 21, and the fixture is held firmly in an upright position, and tee handle is backed off slightly and blade is rotated across the stone with the free hand.

Having thus described the preferred embodiment of the invention it should be understood that numerous structural modifications and adaptations may be resorted to without departing from the spirit of the invention.

What is claimed is:

1. In a circular saw blade sharpening device, for use with a rotatable sharpening stone mounted on the vertical axis of and driven by a drill press, a generally horizontal base, a generally horizontal shaft mounted on said base, a body mounted for rotation on said shaft, means on said shaft for adjusting said shaft endwise with respect to said base, a fixture mounted on said body and having a fixed section and a second section pivotally mounted to said body by a pivot parallel to said shaft with said second section swingable toward and away from said fixed section for releasably clamping a circular saw blade therebetween, adjustable means on said body engagable with said base for limiting movement of said fixture about said shaft, means adjustably secured to said fixed section for directly engaging an individual tooth of the saw blade to be sharpened for indexing the saw teeth for grinding, means on said fixed and second sections for mounting a circular saw blade thereon and securing said second section to said fixed section.

2. A device as claimed in claim 1 wherein said means for indexing includes a bar adjustably connected to said fixed section, a holder on the outer end of said bar, and a resilient index leaf connected to said holder for selectively engaging the teeth of the blade being sharpened.

3. A device as claimed in claim 1 and further including a tension screw adjustably connected to said second section of said fixture for engagement with the saw blade to be sharpened.

* * * * *